UNITED STATES PATENT OFFICE.

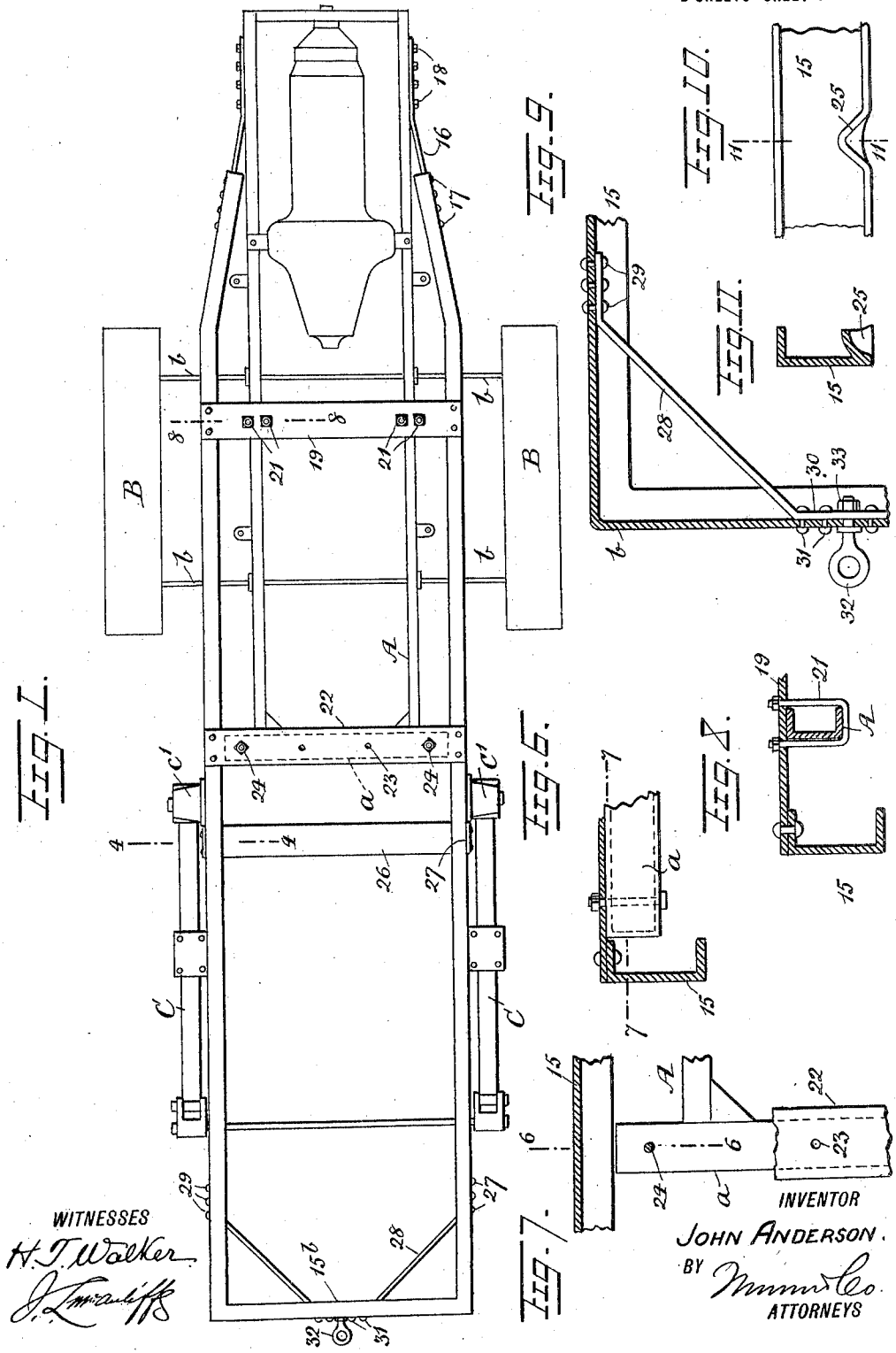

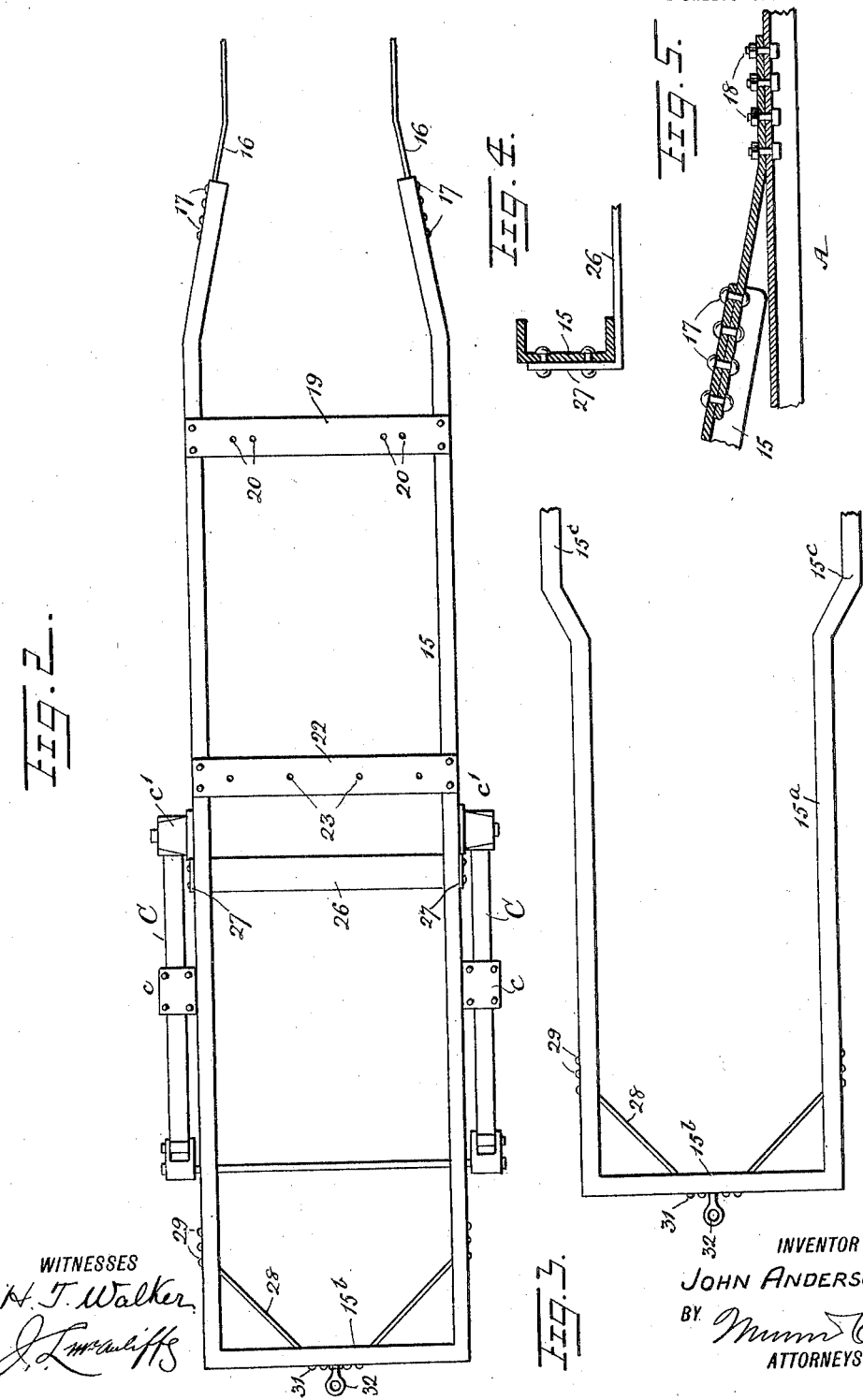

JOHN ANDERSON, OF SEATTLE, WASHINGTON.

TRUCK ATTACHMENT FOR AUTOMOBILES.

1,399,597.   Specification of Letters Patent.   Patented Dec. 6, 1921.

Application filed November 11, 1918. Serial No. 262,013.

*To all whom it may concern:*

Be it known that I, JOHN ANDERSON, a citizen of Great Britain, and a resident of Seattle, in the county of King and State of Washington, have invented a new and Improved Truck Attachment for Automobiles, of which the following is a description.

My invention relates to automobiles and particularly to means for converting a pleasure vehicle into an auto truck.

The general object of the invention is to provide an attachment that may be easily and quickly applied to the frame of the pleasure vehicle to thereby convert the latter into a truck, as well as to provide for the ready removal of the attachment to restore the vehicle to its original character.

More specifically, the invention has for its purpose, to so form the truck frame and its appurtenances as to stiffen and prevent sagging of the same or the frame of the chassis when the two are united; to provide a truck frame attachment having side springs adapted to be mounted on a truck axle, the frame being provided with cross bars of such a character and so positioned as to prevent winding of the truck frame due to the thrust or strain imposed thereon through the springs; to provide a truck frame with transverse members and brace members of a character to result in great flexibility in the frame with the maximum strength and minimum weight; to provide corner brace elements at the rear of the truck frame and a towing member for connection with a trailer so related to each other and to the truck frame as to transmit the pull of towing equally to each side of the truck frame; and to provide a truck frame having channel side bars particularly formed to accord with the step hangers of the automobile chassis to which the truck attachment is to be applied.

The stated objects and others as will appear are attained by the novel construction and arrangement of parts hereinafter particularly described.

Reference is to be had to the accompanying drawings forming a part of this specification, it being understood that the drawings are merely illustrative of one example of the invention.

Figure 1 is a plan view of a truck attachment embodying my invention and showing the same applied to the chassis of a pleasure automobile conventionally indicated in its essentials;

Fig. 2 is a plan view of the truck attachment;

Fig. 3 is a fragmentary plan view showing portions of my improved truck frame slightly modified as to its side members;

Fig. 4 is a detail in cross section on the line 4—4, Fig. 1;

Fig. 5 is a sectional plan view of means for securing the truck attachment at the front end thereof to the frame of the pleasure vehicle;

Fig. 6 is a detail in transverse vertical section approximately on the line 6—6, Fig. 7;

Fig. 7 is a detail in sectional plan view on the line 7—7, Fig. 6;

Fig. 8 is a detail in cross section on the line 8—8, Fig. 1;

Fig. 9 is a fragmentary sectional plan view of a portion of the rear end of the attachment;

Fig. 10 is a fragmentary view in side elevation of a part of a side bar of the truck frame and to be hereinafter particularly referred to;

Fig. 11 is a cross section on the line 11—11, Fig. 10.

In carrying out my invention in practice in accordance with the illustrated example, a truck frame 15 is provided presenting side bars and a rear cross bar 15$^b$. In practice the frame is made from continuous channel iron bent generally into U-shape, the flanges of the channel bar being cut out at the ends of the rear cross bar and welded. The frame is of a width so that the side bars of the frame 15 are separated a distance to lie outside of the side members of the chassis frame A of a pleasure vehicle when the attachment is imposed on the said frame A as seen in Fig. 1. The forward ends of the side bars of the truck frame 15 are usually made slightly convergent and secured thereto are flat steel extension elements 16 disposed vertically, said elements being riveted or otherwise rigidly fastened as at 17 to the frame 15 and their forward parallel ends being adapted to lie flatwise against the outer sides of the frame A to which they are secured by transverse bolts 18.

Connecting the side bars of the truck frame 15 are thin flat bars 19 disposed at the top of said frame and suitably secured at its ends to the latter. Pairs of vertical bolt holes 20 are formed in the cross bars 19 adapted to receive U-bolts 21 which embrace the side bars of the frame A, thereby firmly connecting the truck frame with the frame A laterally inward from side bars of the truck frame 15 and at a point along the side bars of the automobile. In addition to the forward cross bar 19 at the top of the frame 15 a second top cross bar 22 is provided rigidly secured at its ends to the side bars of the frame 15 in a position sufficiently rearward of the first cross bar that it will be directly imposed upon the rear cross bar $a$ of the automobile frame. In said second cross bar 22 vertical bolt holes 23 are provided in suitable number to receive bolts 24 which pass through the cross bars $a$ and 22.

The steps of the pleasure vehicle are indicated at B and the usual hangers thereof at $b$ and in order to adapt the side channel bars of the truck frame 15 to the hangers $b$, said side bars are produced with depressions 25 in the lower flanges thereof (see Figs. 10 and 11) in position to receive the obliquely disposed hangers $b$.

The truck frame 15 is provided with side springs C having any suitable means conventionally indicated at $c$ for mounting the springs on the truck axle (not shown) and the forward ends of said springs are connected with the side bars of the frame 15 by brackets $c'$. Thus, the strain of the drive will be imparted by the side bars of the frame 15 through the springs C and brackets $c'$ and in order to prevent the frame 15 from winding under the strain I provide a girt in the form of a third transverse bar 26, at the under side of the frame 15, and secured at its ends to the side bars. The said girt bar 26 has upturned ends 27 riveted or otherwise rigidly fastened to the side bars of the frame 15 at the outside.

For adapting my improved attachment to extra wide automobile frames, the side bars 15$^a$ as in Fig. 3 may have the forward portions thereof offset outwardly as at 15$^c$ thereby preserving a desirable width at the rear of the frame 15$^a$.

At the rear corners of the truck frame 15 (or 15$^a$) diagonal braces 28 are provided integral with each other through the medium of a rear intermediate horizontal member 30 (Fig. 9). The braces 28 are riveted or otherwise rigidly fastened as at 29 to the side bars of the frame 15 at the interior of the channels while the transverse intermediate member 30 of the braces is riveted as at 31 to the rear cross bar 15$^b$ of the truck frame. To connect the truck frame with a trailer, an eye 32 or equivalent trailing member is secured centrally of the bar 15$^b$ and having the shank thereof passing through the end bar 15$^b$ and through the member 30 of the braces, the connection being completed by a nut 33. Thus, the pull caused by the towing of the trailer will be effectively distributed equally to both side bars of the frame 15. It will be noted from the foregoing that the attachment or detachment of the truck frame is effected through the medium of the transverse bolts 18, the U-bolts 21, and the bolts 24, so that the conversion of a pleasure vehicle into a truck and vice versa, it will be appreciated, may be quickly effected. The cross bars 19, 22, 26 as well as the front connecting extensions 16 are of thin flat material so that flexibility is attained with lightness and the maximum strength is produced owing to the location of the bars 19, 22 and 26, relatively to one another and relatively to the frame A. Moreover, it is to be noted that the act of placing the extension frame on the frame of the automobile, positions the bolt holes of cross bars 19 and 20 for receiving the bolts that engage respectively the side bars and the rear cross bar of the automobile frame.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. An attachment for application to the chassis of an automobile for converting the latter into a truck, including a truck frame adapted to be imposed on the frame of an automobile and presenting side bars spaced to lie outside of the side members of the automobile frame, steel elements on said side bars and projecting forwardly beyond the same, said elements presenting front portions offset laterally inward from the general planes of said side bars and presenting side surfaces adapted to lie against the said members of the automobile frame, means to detachably secure said elements to the automobile frame, a cross bar on top of said side bars and secured thereto, vertically disposed U-bolts extending through said side bars in position to receive and effect clamping engagement with the side members of the automobile frame, a second cross bar also disposed on top of said side bars rearward of the first cross bar and positioned to be imposed on the rear cross bar of the automobile frame, bolts for securing said rear cross bar to the imposed second mentioned cross bar, side springs at the outside of said side bars, rearward of the second mentioned cross bar, brackets on said side bars to which the forward ends of the springs are connected, and a girt uniting said side bars and disposed at the under side of the latter adjacent to said brackets to resist any tendency of the truck frame to wind.

2. An attachment for application to the chassis of an automobile for converting the latter into a truck, said attachment including a truck frame adapted to lie upon the frame of an automobile and presenting side bars spaced to lie outside of the side bars of the automobile frame, means to secure the front end of the truck frame to the automobile frame, a cross bar uniting the side bars of the truck frame at the upper side of the latter and adapted to lie across the side bars of the automobile frame, U-bolts adapted to clip the side bars of the automobile frame to the said cross bar, a second cross bar uniting the side bars of the truck frame and disposed at the upper side of the latter between the first cross bar and the rear end of the truck frame, said second cross bar being positioned to lie upon the rear cross bar of the automobile frame, and vertical bolts in said second bar and adapted to removably secure the same to said rear cross bar of the automobile frame.

3. An attachment for application to the chassis of an automobile for converting the latter into a truck, said attachment comprising a truck frame presenting side bars adapted to lie upon the frame of the automobile, and having a rear cross bar, means to secure said truck frame forward of said rear cross bar to the automobile frame, oblique corner braces extending from the said rear cross bar to said side bars and secured respectively at their front ends to the latter, a central cross member integral with said corner braces and secured to said cross bar of the truck frame at the inner side thereof, and a member adapted to be connected with a trailer and having a shank extending through said rear cross bar of the truck frame and through said cross member of the braces to distribute the pull of the trailer through the said cross bar and cross member equally to the said side bars.

JOHN ANDERSON.